United States Patent
Kagawa (10) Patent No.: US 11,026,227 B2
(45) Date of Patent: Jun. 1, 2021

(54) WIRELESS COMMUNICATION DEVICE AND RECORDING MEDIUM FOR TRANSMITTING FRAMES WHILE AVOIDING COLLISIONS WITH OTHER FRAMES

(71) Applicant: SILEX TECHNOLOGY, INC., Kyoto (JP)

(72) Inventor: Tadayoshi Kagawa, Kyoto (JP)

(73) Assignee: SILEX TECHNOLOGY, INC., Kyoto (JP)

( * ) Notice: Subject to any disclaimer, the term of this patent is extended or adjusted under 35 U.S.C. 154(b) by 123 days.

(21) Appl. No.: 16/463,947

(22) PCT Filed: Nov. 21, 2017

(86) PCT No.: PCT/JP2017/041854
§ 371 (c)(1),
(2) Date: May 24, 2019

(87) PCT Pub. No.: WO2018/101127
PCT Pub. Date: Jun. 7, 2018

(65) Prior Publication Data
US 2020/0389893 A1 Dec. 10, 2020

(30) Foreign Application Priority Data
Nov. 30, 2016 (JP) .............................. JP2016-232519

(51) Int. Cl.
*H04L 12/413* (2006.01)
*H04W 72/04* (2009.01)
*H04W 74/08* (2009.01)

(52) U.S. Cl.
CPC ....... *H04W 72/0446* (2013.01); *H04L 12/413* (2013.01); *H04W 74/0816* (2013.01)

(58) Field of Classification Search
CPC .............. H04W 74/08; H04W 74/0808; H04L 12/413; H04L 47/32
See application file for complete search history.

(56) References Cited

U.S. PATENT DOCUMENTS

2006/0025124 A1   2/2006   Matsumoto
2008/0279102 A1*  11/2008  Sankaran ................ H04L 49/50
                                                          370/235
(Continued)

FOREIGN PATENT DOCUMENTS

JP         2004-297400          10/2004

OTHER PUBLICATIONS

International Search Report dated Feb. 13, 2018 in International (PCT) Application No. PCT/JP2017/041854.

*Primary Examiner* — Salvador E Rivas
(74) *Attorney, Agent, or Firm* — Wenderoth, Lind & Ponack, L.L.P.

(57) ABSTRACT

A wireless communication device includes: a transmission unit; a carrier sense unit; a transmission time calculating unit that estimates a necessary transmission time taken from start to completion of the transmission of the wireless frame; a time-out time calculating unit that calculates a time-out time from the predetermined time period and the necessary transmission time; a frame transmission determining unit that compares a carrier detection time during which a carrier notified from the carrier sense unit is detected with the time-out time to determine whether to transmit or discard the wireless frame; and a control unit that, based on the determination result notified from the frame transmission determining unit, (i) notify the transmission unit that the wireless frame is to be transmitted when it is determined to transmit the wireless frame, and (ii) discard the wireless frame when it is determined to cancel the wireless frame.

3 Claims, 7 Drawing Sheets (56) References Cited

U.S. PATENT DOCUMENTS

2008/0279210 A1* 11/2008 Naka .................... H04W 28/18
370/448
2013/0155955 A1* 6/2013 Nabetani ............... H04W 28/18
370/328

* cited by examiner

WIRELESS COMMUNICATION DEVICE AND RECORDING MEDIUM FOR TRANSMITTING FRAMES WHILE AVOIDING COLLISIONS WITH OTHER FRAMES

TECHNICAL FIELD

The present invention relates to access control for a wireless LAN communication.

BACKGROUND ART

In wireless LAN communication, one example of access control methods for allowing a plurality of wireless LAN terminals to share same frequencies is Carrier Sense Multiple Access with Collision Avoidance (CSMA/CA).

In CSMA/CA, a wireless LAN terminal checks situation of use of wireless channels in the surroundings (hereinafter, also referred to as carrier sense) when data (wireless frame) to be transmitted has occurred. Then, the wireless LAN terminal transmits data (wireless frame) when it does not receive a signal (carrier) sent from any other wireless LAN terminals. Thus, collision with data transmitted by the other wireless LAN terminal can be avoided.

Further, having determined that no carrier is received, the wireless LAN terminal selects a value (fixed time) determined by a random number called a back-off value, and reduces the back-off value as time elapses, then carries out transmission only after the back-off value becomes zero. That is, after no carrier is detected, a transmission stand-by time which is determined randomly is provided. Note that the determination whether carrier is received or not depends on the fact that radio wave is detected within a predetermined time period, which means there is signal flowing on radio wave. Owing to such a mechanism (hereinafter, referred to as a back-off algorithm), a wireless LAN terminal can further reduce collision probability of the wireless frame to be transmitted. When collision between radio waves has occurred as well, the wireless terminal retransmits the wireless frame after an interval determined by a random number.

Under the condition where CSMA/CA scheme which performs carrier sense is used in this way, for example, as the number of wireless LAN terminals increases resulting in an environment in which wireless frames are congested, it will take more time for a certain terminal to start transmission since it cannot transmit the wireless frame during a period in which any carrier in the surroundings is being detected. In that case, the time when any carrier in the surroundings will not be detected depends on the environment, and there may be a case in which the wireless LAN terminal cannot transmit the frame within a delay time of wireless communication (time from the occurrence of transmission of a wireless frame to the completion of transmission) which is permitted by the system. Particularly in a system in which permitted delay time is small (for example, in a system for controlling a wireless communication device travelling at a high speed), serious adverse effects on the entire system may be caused.

In the wireless information communication system according to Patent Literature 1, an access point transmits a packet in a CSMA/CA scheme during normal time. Then, when a packet becomes likely to be discarded due to time-out, by using a polling scheme which is a different communication method, a transmission right is forcibly given to the wireless terminal so that the packet will not be discarded in the wireless terminal due to time-out.

CITATION LIST

Patent Literature

[PTL 1] Japanese Unexamined Patent Application Publication No. 2004-297400

SUMMARY OF INVENTION

Technical Problem

However, in the wireless information communication system according to Patent Literature 1, the access point is provided with two communication control schemes, and in those communication control schemes, when a packet becomes likely to be discarded due to time-out in the wireless terminal, a transmission right is forcibly given to the wireless terminal. Since the wireless terminal which is given transmission right carries out transmission in the wireless information communication system, collision of wireless frames may occur if a wireless frame which is transmitted from another wireless terminal is in communication. Thus, it is hard to say that communication quality in the system is stable. Further a problem exists in that the control method becomes complicated, and also the control within the system becomes cumbersome.

It is an object of the present invention to transmit a wireless frame to be transmitted within a predetermined time period from occurrence of wireless frame transmission to completion of the transmission, while avoiding collision with another wireless frame in a system in which a permitted delay time is short.

Solution to Problem

In order to achieve the above-described object, in accordance with the present invention, there is provided a wireless communication device in a wireless communication system which transmits a wireless frame to be transmitted within a predetermined time period, the wireless communication device comprising: a transmission unit configured to transmit the wireless frame; a carrier sense unit configured to check whether or not any carrier is being transmitted from other wireless communication devices; a transmission time calculating unit configured to calculate a necessary transmission time which is an estimated time period taken from start of the transmission of the wireless frame to completion of the transmission; a time-out time calculating unit configured to calculate a time-out time from the predetermined time period and the necessary transmission time; a frame transmission determining unit configured to compare a carrier detection time with the time-out time to determine whether to transmit or discard the wireless frame, and notify a control unit of a result of the determination, the carrier detection time being a time period during which a carrier notified from the carrier sense unit s detected; and the control unit configured to, based on the result of the determination notified from the frame transmission determining unit, (i) notify the transmission unit that the wireless frame is to be transmitted when the frame transmission determining unit determines to transmit the wireless frame, and (ii) discard the wireless frame when the frame transmission determining unit determines to discard the wireless frame.

It is desirable that the frame transmission determining unit is configured to (i) determine to transmit the wireless frame when a numerical value obtained by subtracting the carrier detection time from the time-out time is larger than or equal to 0, and (ii) determines to discard the wireless frame when the numerical value is less than 0.

It is further desirable that when the transmission unit is notified from the control unit that the wireless frame is to be transmitted, the transmission unit is configured to immediately transmit the wireless frame without waiting for a random transmission stand-by time before the transmission.

Here, the predetermined time period is exemplified as a limit time in the following description of embodiments.

Advantageous Effects of Invention

Since, according to the wireless communication device of the present invention, it is possible to transmit a wireless frame to be transmitted within a predetermined time period while avoiding collisions between wireless frames, it is possible to maintain reliability of the entire system even in a system in which a permitted delay time is short.

DESCRIPTION OF EMBODIMENTS

Hereinafter, certain exemplary embodiments are described in greater detail with reference to the accompanying Drawings. Numerical values, constituent elements, arrangement positions of the constituent elements, and the like described in the following embodiments are merely examples, and may be modified or changed in various ways within the scope of the present invention.

Embodiments

Figure 1:
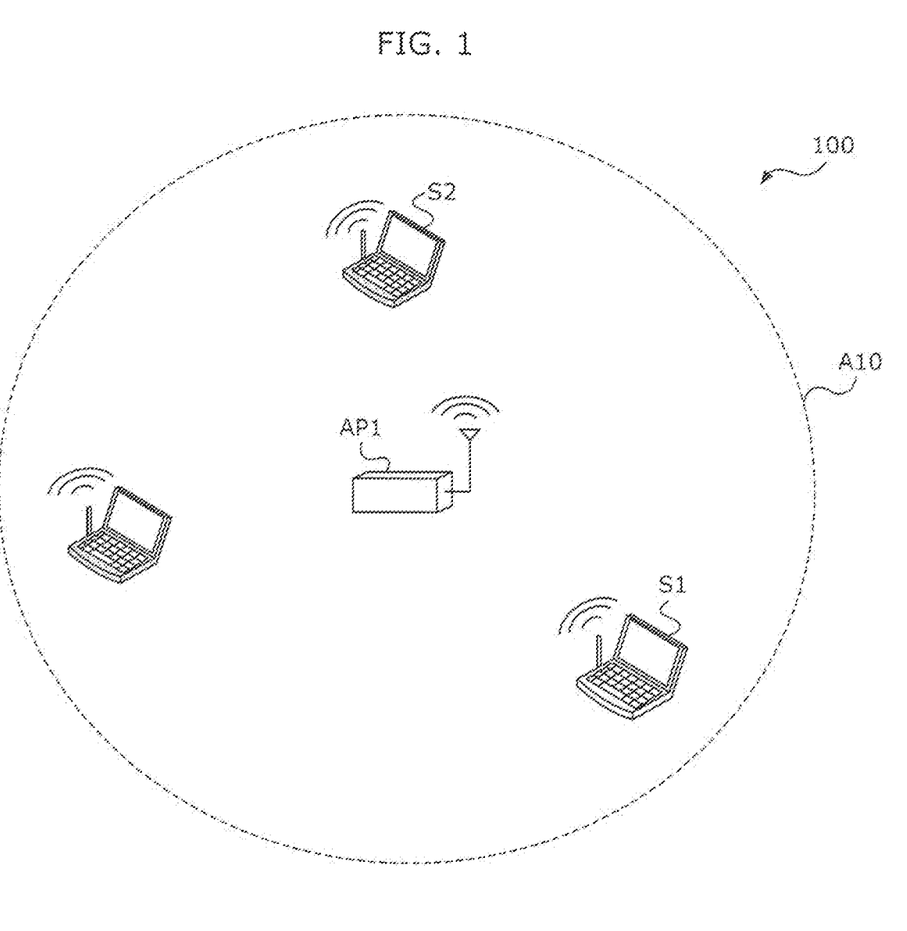
FIG. 1 is a general view of a wireless communication system according to an embodiment of the present invention.

FIG. 1 is a general view of a wireless communication system according to an embodiment of the present invention.

As shown in FIG. 1, a wireless communication system 100 according to the embodiment of the present invention includes a wireless communication device AP1, a wireless communication device S1, a wireless communication device S2, and the like.

Further, although the wireless communication system 100 of the embodiment of the present invention will be described by way of the two wireless communication devices S1 and S2, it may be made up with, without being limited thereto, other multiple wireless communication devices.

Note that the wireless communication device S2 has the same function as that of the wireless communication device S1. Hereinafter, the detailed description of the wireless communication device S2 is the same as that of the wireless communication device S1, and therefore description thereof will be omitted.

The wireless communication device AP1, which is a so-called access point, can relay the communication performed mutually between the wireless communication device S1 and the wireless communication device S2, and also can mutually relay the communication between a network (not shown) to which itself (wireless communication device AP1) is connected and the wireless communication device S1 or the wireless communication device S2.

Moreover, the wireless communication device AP1 is equipped with a network interface, and the network interface includes at least a wireless communication interface. The wireless communication interface is, for example, an interface which performs communication based on IEEE802.11 standard.

The wireless communication device S1 can mutually perform wireless communication with the wireless communication device AP1 and the wireless communication device S2 via the wireless communication device AP1. Here, it corresponds to a station (terminal) of the wireless LAN.

Moreover, the wireless communication device S1 is equipped with at least a wireless communication interface as with the wireless communication device AP1.

The wireless communication device S2 corresponds to a station (terminal) of the wireless LAN, which has equivalent functions as the wireless communication device S1.

Figure 2:
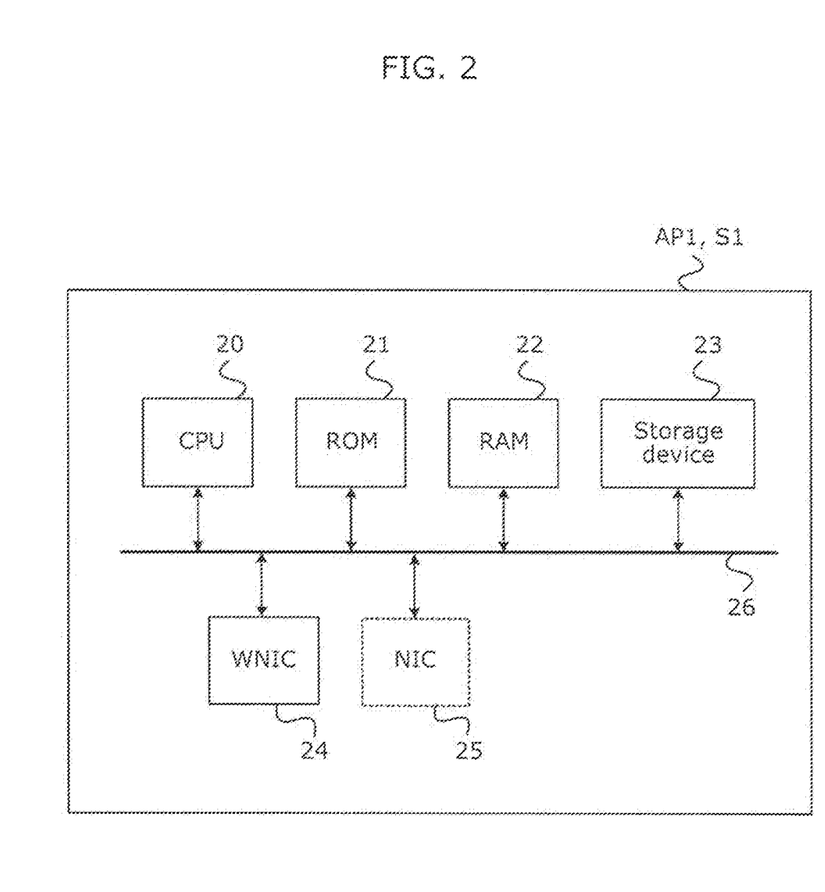
FIG. 2 is a hardware configuration diagram of a wireless communication device AP1 or a wireless communication device S1 according to an embodiment of the present invention.

FIG. 2 is a hardware configuration diagram of the wireless communication device AP1 and the wireless communication device S1 according to the embodiment of the present invention. It should be noted that the wireless communication device S2 has the essentially same hardware structure as that of the wireless communication device S1 and therefore detailed explanation of the wireless communication device S2 is omitted.

As shown in FIG. 2, these devices each include a CPU (Central Processing Unit) 20, a ROM (Read Only Memory) 21, a RAM (Random Access Memory) 22, a storage device 23, a WNIC (Wireless Network Interface Card) 24, an NIC (Network Interface Card) 25, and an internal bus 26 which connects each component.

The CPU 20 is a processor that executes a control program stored in the ROM 21.

The ROM 21 is a read-only storage region that holds the control program, etc.

The RAM 22 is a storage region that is used as a work area when the CPU 20 executes the control program.

The storage device 23 is a storage region that temporarily stores the control program, control information, device information, or information.

The WNIC 24 includes a wireless communication interface for performing wireless communication. For example, it is a communication interface for wireless LAN which is compatible with IEEE 802.11a, b, g, n, ac standards, etc.

The NIC 25 includes a wired communication interface for performing wired communication. For example, it is a communication interface of wired LAN which is compatible with IEEE 802. 3 standard, etc. Note that the wireless communication device AP1 and the wireless communication device S1 according to an embodiment of the present invention does not necessarily need to include the NIC 25.

The internal bus 26 is a bus that electrically interconnects the CPU 20, the ROM 21, the RAM 22, the storage device 23, the WNIC 24, and the NIC 25 to exchange signals.

Figure 3:
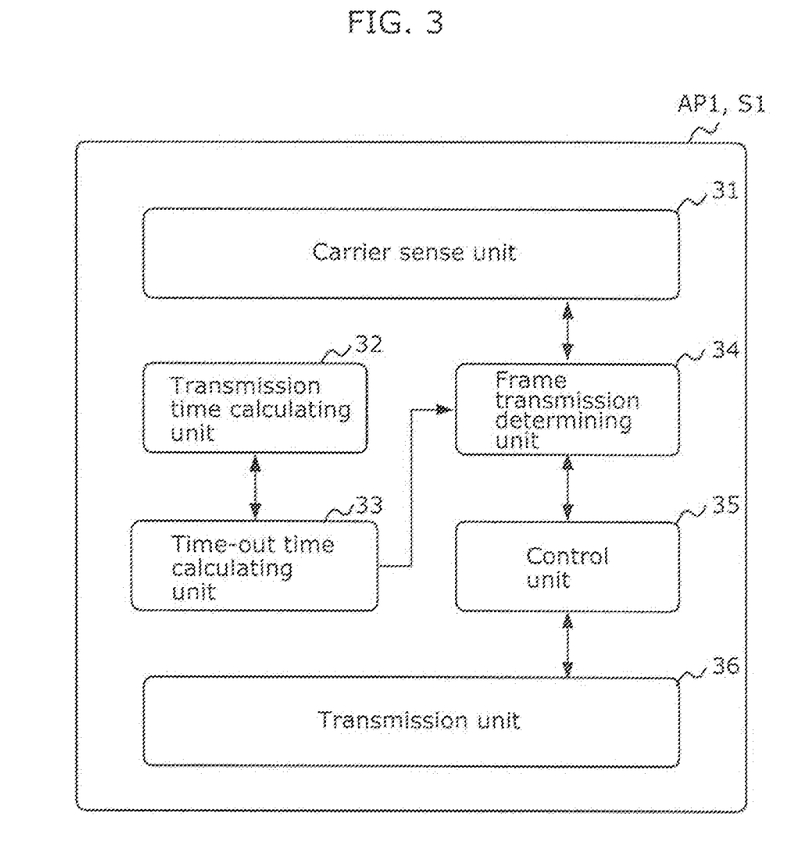
FIG. 3 is a functional block diagram of a wireless communication device according to an embodiment of the present invention.

FIG. 3 is a functional block diagram of the wireless communication device AP1 and the wireless communication device S1 according to the embodiment of the present invention. Hereinafter, the wireless communication device AP1 and the wireless communication device S1 are collectively called a wireless communication device.

The wireless communication device shown in FIG. 3 includes a carrier sense unit 31, a transmission time calculating unit 32, a time-out time calculating unit 33, a frame transmission determining unit 34, a control unit 35, a transmission unit 36, and the like.

The carrier sense unit 31 receives a notification of the control unit 35 to check whether or not a carrier (radio wave) is being transmitted with the same frequency from other wireless communication devices in the surroundings (for example, a signal transmitted by the wireless communication device S2). Then, upon detecting a carrier from other wireless communication devices, the carrier sense unit 31 temporarily stores the time of detection in a memory (the ROM 21 or the storage device 23).

Moreover, when no carrier is detected in the carrier sense, the carrier sense unit 31 notifies the control unit 35 of that.

Further, the carrier sense unit 31 calculates a carrier detection time (time period during which carrier is being detected) which is difference between the time at which a carrier is detected from other wireless communication device and the time at which no carrier comes to be detected in contiguously executed carrier sense, and notifies the frame transmission determining unit 34 of the carrier detection time. The carrier sense unit 31 is implemented by the CPU 20, the ROM 21, the RAM 22, the storage device 23, the WNIC 24, and the like.

Receiving the notification from the control unit 35, the transmission time calculating unit 32 calculates a necessary transmission time, and temporarily stores it in the memory. Here, the necessary transmission time is an estimated time taken from start to completion of the transmission of a wireless frame to be actually transmitted toward a transmission destination, and is calculated from the size of a wireless frame to be transmitted and a transfer rate. The necessary transmission time can be determined by a calculation such as (data size/transfer rate)×the number of retransmission. The transmission time calculating unit 32 is implemented by the CPU 20, the ROM 21, the RAM 22, the storage device 23, and the like.

Upon receiving the notification from the control unit 35, the time-out time calculating unit 33 first acquires a delay time permitted by the wireless communication system, which is stored in the memory. The delay time (hereinafter, also referred to as a limit time) is a time period, which is permitted by the system and set in advance, from the time at which a wireless frame to be transmitted occurs according to an instruction (direction) from an upper level application (not shown) to the time at which the transmission of the wireless frame to a transmission destination is completed.

As for the limit time, various numerical values could be set by a user or at the time of factory shipping, depending on the wireless communication system to be constructed. Particularly, the limit time is often set to be short in a system such as an automatic conveyance system for which strict communication control is required.

Further, the time-out time calculating unit 33 calculates a time-out time from the limit time and the necessary transmission time which is calculated by the transmission time calculating unit 32 and is temporarily stored in the memory. More specifically, the time-out time is calculated by subtracting the necessary transmission time from the limit time.

Further, the time-out time calculating unit 33 notifies the frame transmission determining unit 34 of the time-out time. The time-out time calculating unit 33 is implemented by the CPU 20, the ROM 21, the RAM 22, the storage device 23, and the like.

The frame transmission determining unit 34 determines whether or not it receives from an upper level application (not shown) an instruction (direction) that a wireless frame to be transmitted has occurred. When receiving a notification of occurrence, the frame transmission determining unit 34 notifies the control unit 35 of the reception, and when not receiving the notification of occurrence, it repeats the determining process.

The frame transmission determining unit 34 compares numerical value of the carrier detection time notified from the carrier sense unit 31 and that of the time-out time notified from the time-out time calculating unit 33. Here, the carrier detection time and the time-out time are represented by a numerical value such as 1 second, 100 ms, and the like.

The frame transmission determining unit 34 determines whether the numerical value obtained by subtracting the carrier detection time from the time-out time is larger than, equal to, or less than 0, and notifies the control unit 35 whether the wireless frame to be transmitted should be transmitted or discarded.

The frame transmission determining unit 34 is implemented by the CPU 20, the ROM 21, the RAM 22, the storage device 23, and the like.

The control unit 35 notifies the carrier sense unit 31 to perform carrier sense. It also notifies the transmission time calculating unit 32 that a wireless frame to be transmitted has occurred. Here, the information in the notification from the control unit 35 to the transmission time calculating unit 32 (hereinafter, referred to as wireless frame transmission information) may include a time at which the wireless frame to be transmitted occurred, and a data size of the wireless frame to be transmitted (including a size of a header which is added at transmission), and may also include an address in a memory (not shown) in which wireless frame transmission information is temporarily stored. The control unit 35 also notifies the time-out time calculating unit 33 that a wireless frame to be transmitted has occurred.

Further, when transmitting a wireless frame to be transmitted under a direction from the frame transmission determining unit 34, the control unit 35 notifies the transmission unit 36 of that. Furthermore, upon receiving a notification of discarding, the control unit 35 discards the wireless frame to be transmitted. The control unit 35 is implemented by the CPU 20, the ROM 21, the RAM 22, the storage device 23, and the like.

The transmission unit 36 immediately transmits the wireless frame to be transmitted to a wireless communication device of transmission destination under the direction from the control unit 35. The transmission unit 36 is implemented by the CPU 20, the ROM 21, the RAM 22, the WNIC 24, and the like.

Figure 4:
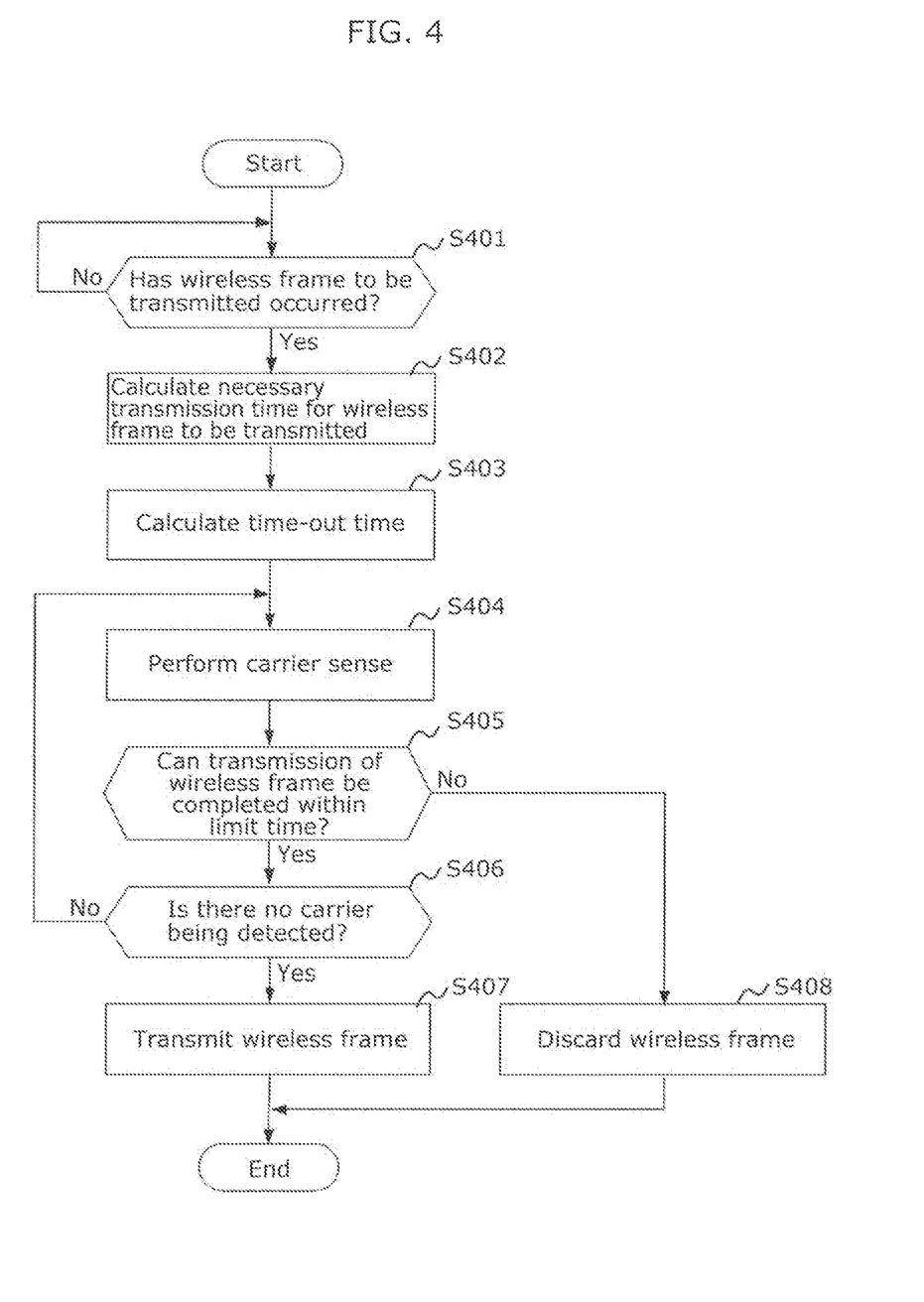
FIG. 4 is a flowchart of a series of operation from occurrence of wireless frame transmission to completion of transmission in a wireless communication device according to an embodiment of the present invention.

FIG. 4 is a flowchart of a series of operations of the wireless communication device according to an embodiment of the present invention in wireless communication, from occurrence of a request for transmission of a wireless frame to determination of whether to transmit the wireless frame to the wireless communication destination or to discard the wireless frame. Hereinafter, details thereof will be described in due order.

In step S401, the frame transmission determining unit 34 determines whether or not a direction (instruction) indicating that a wireless frame to be transmitted has occurred is received from an upper level application (not shown). When a notification of occurrence is received, the frame transmission determining unit 34 notifies the control unit 35 of the reception, and the process moves to step S402 (Yes in step S401). When a notification of occurrence is not received, the frame transmission determining unit 34 repeats step S401 (No in step S401).

In step S402, the control unit 35 notifies the transmission time calculating unit 32 and the time-out time calculating unit 33 of the occurrence of a wireless frame to be transmitted. And upon receiving the notification from the control unit 35, the transmission time calculating unit 32 calculates a necessary transmission time and stores it temporarily in a memory (for example, the RAM 22, the storage device 23, and the like).

Next, in step S403, upon receiving a notification from the control unit 35 in step S402, the time-out time calculating unit 33 acquires a limit time stored in the memory. Then, the time-out time calculating unit 33 calculates a time-out time from the acquired limit time and the necessary transmission time temporarily stored in the memory in step S402. The time-out time calculating unit 33 notifies the frame transmission determining unit 34 of the time-out time.

Further in step S404, the control unit 35 notifies the carrier sense unit 31 to execute carrier sense. Upon receiving the notification from the control unit 35, the carrier sense unit 31 checks whether or not a carrier (radio wave) is being transmitted with the same frequency from other wireless communication devices in the surroundings. Then, upon detecting a carrier from other wireless communication device, the carrier sense unit 31 temporarily stores the time of the detection in a memory.

Next, the carrier sense unit 31 calculates a carrier detection time. Then, the carrier sense unit 31 notifies the frame transmission determining unit 34 of the carrier detection time.

In step S405, the frame transmission determining unit 34 compares numerical values of the carrier detection time notified from the carrier sense unit 31 and the time-out time notified from the time-out time calculating unit 33. Note that the carrier detection time and the time-out time are represented by a numerical value, for example, 1 second, 100 ms, and the like. When the frame transmission determining unit 34 determines that the numerical value obtained by subtracting the carrier detection time from the time-out time is larger than or equal to 0 (that is, ≥0), the process moves to step S406 (Yes in step S405). When the subtracted numerical value is less than 0 (that is, <0), the frame transmission determining unit 34 notifies the control unit 35 of discarding of the wireless frame to be transmitted, and the process moves to step S408 (No in step S405).

In step S406, the carrier sense unit 31 continues to perform carrier sense. When no carrier is detected, the carrier sense unit 31 notifies the control unit 35 of that, and the process moves to step S407 (Yes in step S406). When a carrier is detected, the carrier sense unit 31 notifies the control unit 35 that carrier sense continues to be performed, and repeats step S404 (No in step S406).

In step S407, the transmission unit 36 transmits a wireless frame to be transmitted under the direction from the control unit 35.

In step S408, the control unit 35 discards the wireless frame to be transmitted under the direction from the frame transmission determining unit 34.

Next, calculations of the necessary transmission time, the time-out time, and the carrier detection time, and the time elapse from occurrence of wireless frame transmission to the completion or discarding of wireless frame transmission according to an embodiment of the present invention will be described by using FIGS. 5, 6, and 7.

Figure 5:
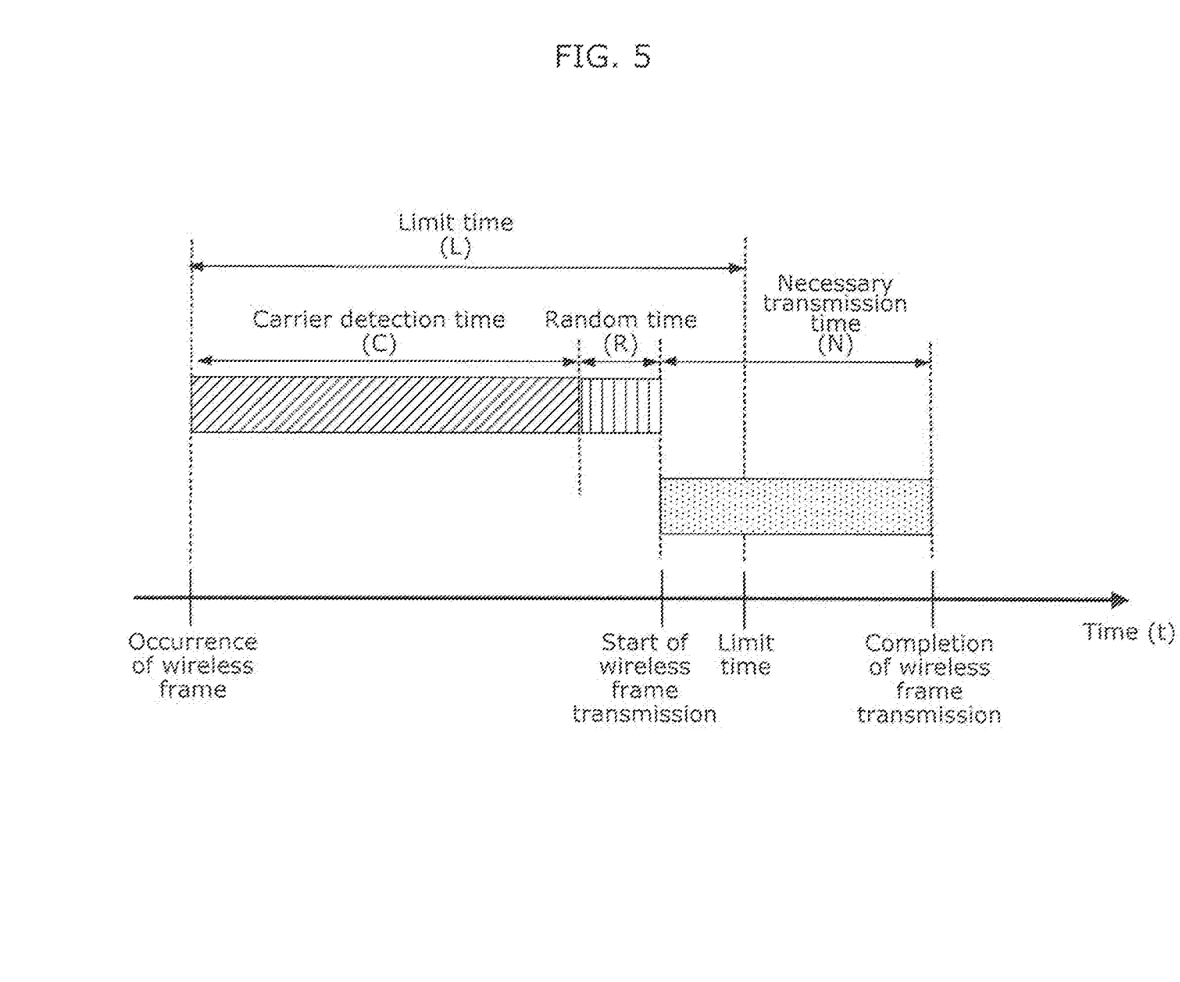
FIG. 5 is a diagram to represent a time elapse from occurrence of wireless frame transmission to completion of transmission in a wireless communication device of conventional art.

FIG. 5 is a diagram to represent a time elapse from occurrence of wireless frame transmission to completion of transmission in a wireless communication device of a conventional art.

In the conventional art as shown in FIG. 5, the own device (wireless communication device) performs carrier sense when a wireless frame to be transmitted occurs in the device. Then, when no carrier is detected, the own device transmits the wireless frame, and when a carrier is detected, it will not perform transmission of the wireless frame even if the wireless frame to be transmitted has occurred. Specifically, the wireless frame transmission will be started only after a time of Carrier detection time (C)+Random time (R) of FIG. 5 has elapsed.

Here, the time from the occurrence of a wireless frame to be transmitted until completion of transmission (hereinafter, referred to as a processing time for completing wireless frame transmission) will be Carrier detection time (C)+Random time (B)+Estimated time (Necessary transmission time (N)) during which wireless frame transmission is started and completed. In an example shown in FIG. 5, the processing time for competing wireless frame transmission is longer compared to the limit time which is permitted in the wireless communication system, and thus the specification is not satisfied, affecting the entire system.

Figure 6:
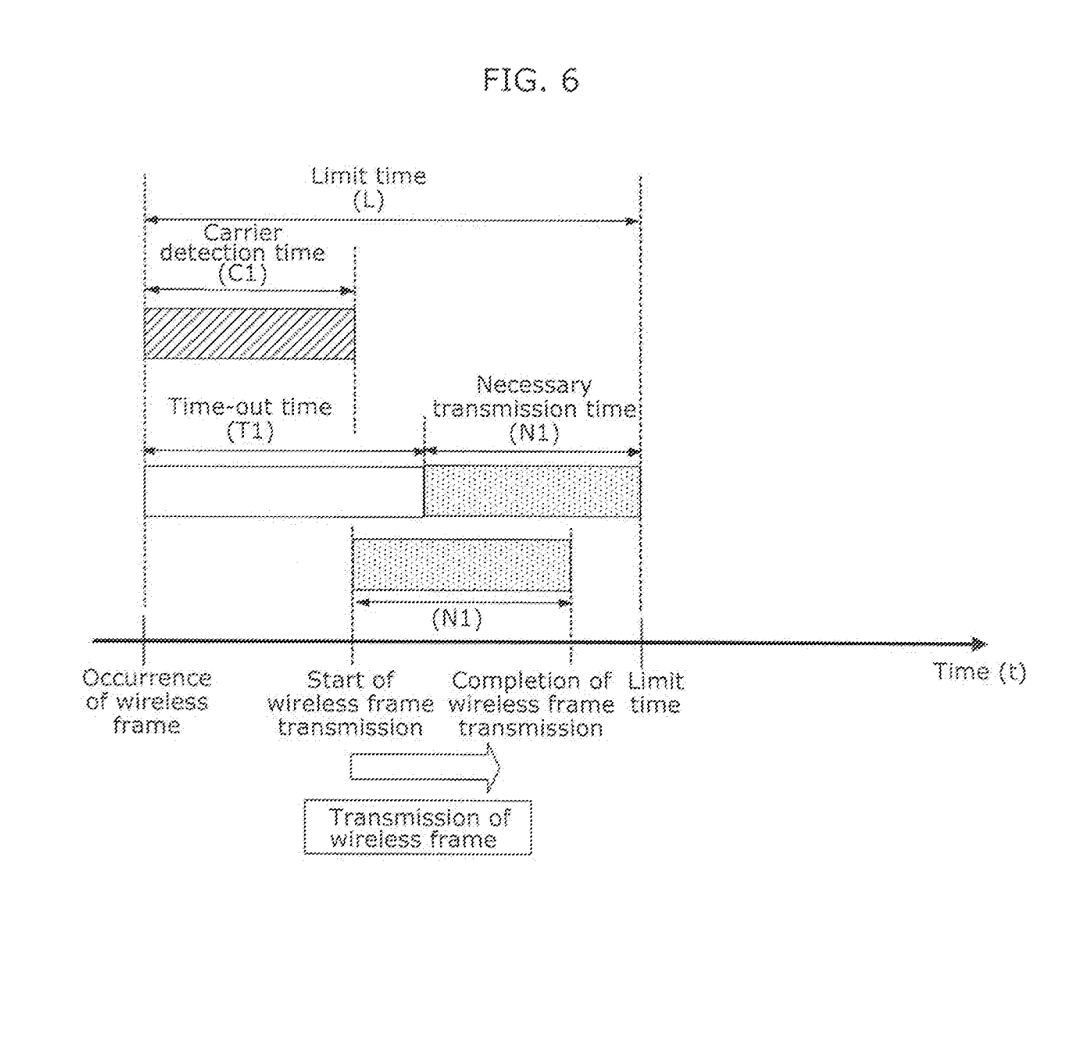
FIG. 6 is a diagram to represent one example of time elapse from occurrence of wireless frame transmission to completion of transmission in a wireless communication device according to an embodiment of the present invention.

FIG. 6 is an example of a diagram to represent time elapse from occurrence of wireless frame transmission until completion of transmission in the wireless communication device according to the embodiment of the present invention. FIG. 6 is an example in the situation where a wireless frame can be transmitted.

As shown in FIG. 6, the wireless communication device according to an embodiment of the present invention, upon occurrence of a wireless frame to be transmitted, calculates Time-out time (T1) from a calculation formula: Time-out time (T1)=Limit time (L)−Necessary transmission time (N1). In the wireless communication device according to the embodiment of the present invention, carrier sense is performed and when no carrier is detected, a wireless frame is immediately transmitted without waiting for a back-off time (random transmission stand-by time).

Where, in the example of FIG. 6, since there is a relation: Time-out time (T1)>Carrier detection time (C1), a wireless frame is transmitted.

Figure 7:
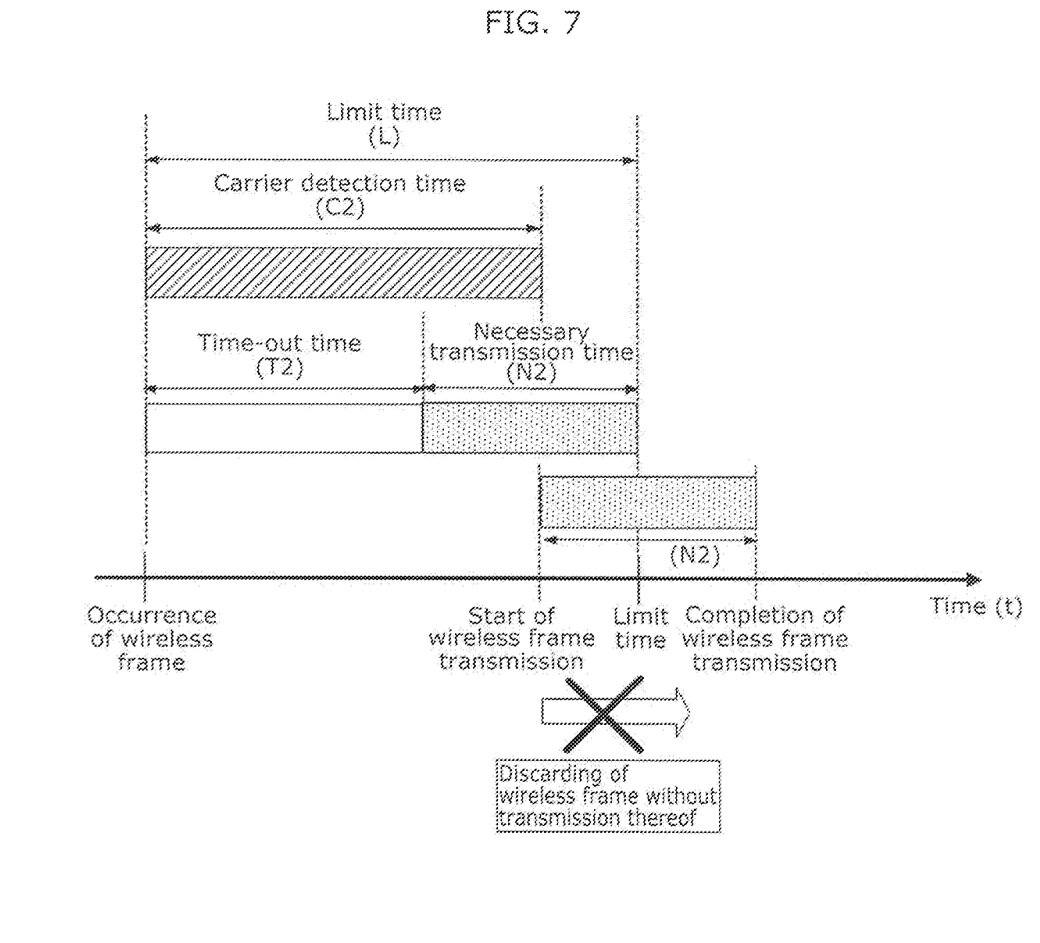
FIG. 7 is a diagram to represent another example, which is different from that of FIG. 6, of time elapse from occurrence of wireless frame transmission to completion of transmission in a wireless communication device according to an embodiment of the present invention.

FIG. 7 is an example of a diagram to represent time elapse from occurrence of wireless frame transmission until completion of transmission in the wireless communication device according to the embodiment of the present invention. FIG. 7 is an example in the situation where a wireless frame can't be transmitted.

As shown in FIG. 7, upon occurrence of a wireless frame to be transmitted, the wireless communication device according to an embodiment of the present invention calculates Time-out time (T2) from a calculation formula: Time-out time (T2)=Limit time (L)−Necessary transmission time (N2).

In an example of FIG. 7, since there exists a relation: Time-out time (T2)<Carrier detection time (C2), the wireless frame is discarded.

In other words, when the numerical value obtained by subtracting the carrier detection time from the time-out time is larger than or equal to 0, the wireless frame to be transmitted is transmitted, while when the numerical value obtained by subtracting the carrier detection time from the time-out time is less than 0, the wireless frame to be transmitted is discarded.

That is, it becomes obvious that as a result of performing carrier sense, the time to complete the transmission of wireless frame will surely exceed Limit time (L) even if wireless frame is immediately transmitted after it becomes that no carrier is detected. In this way, it is possible to avoid that the entire system is affected, by determining in advance whether or not the wireless frame to be transmitted can be transmitted within Limit time (L), and by not transmitting (discarding) the wireless frame when it is determined that transmission is not possible.

Here, the reason why transmission is not performed even for a wireless frame to be transmitted if it is determined that transmission will not be completed within the limit time is as follows. The wireless communication system currently being considered is based on a mechanism by which when the limit time set in advance is reached, transmission of wireless frame is started, therefore, the transmitted wireless frame will become a uncompleted wireless frame (wireless frame which has resulted in a transmission error). In this way, due to wireless frames of which transmission has not been completed within the limit time and which result in transmission errors, the transmission delay Is caused to vary and to be accumulated as a jitter, thus affecting the following transmission control cycle (for example, 100 ms). Moreover, needless to say, if the above described situation occurs in each wireless communication device in the wireless communication system, the entire wireless communication system will be affected.

Therefore, to avoid such a situation, in a system which has a short delay time, when it becomes clear that transmission cannot be performed within the limit time, transmission of wireless frame will not be performed even if it is a wireless frame to be transmitted.

The present application is based on and claims priority of Japanese Patent Application No. 2016-232519 filed on Nov. 30, 2016. The entire disclosure of the above-identified application, including the specification, drawings and claims is incorporated herein by reference in its entirety.

INDUSTRIAL APPLICABILITY

The present invention will be usable for a system in which a delay time is desired to be reduced as much as possible while avoiding collision between wireless frames even when the delay time of communication which is permitted by the system is short. Specifically, it is useful for a wireless communication device equipped in an apparatus which travels in a factory while performing wireless communication.

REFERENCE SIGNS LIST

100 wireless communication system
AP1 wireless communication device (access point)
S1, S2 wireless communication device (station)
A10 wireless communication available area
20 CPU
21 ROM
22 RAM
23 storage device
24 WNIC
25 NIC
26 internal bus
31 carrier sense unit
32 transmission time calculating unit
33 time-out time calculating unit
34 frame transmission determining unit
35 control unit
36 transmission unit

The invention claimed is:

1. A wireless communication device in a wireless communication system which transmits a wireless frame to be transmitted within a predetermined time period, the wireless communication device comprising:
    a non-transitory memory configured to store a program; and
    a hardware processor configured to execute the program, the program when executed causes the wireless communication device to operates as:
    a transmission unit configured to transmit the wireless frame;
    a carrier sense unit configured to check whether or not any carrier is being transmitted from other wireless communication devices;
    a transmission time calculating unit configured to calculate a necessary transmission time which is an estimated time period taken from start of the transmission of the wireless frame to completion of the transmission;
    a time-out time calculating unit configured to calculate a time-out time from the predetermined time period and the necessary transmission time;
    a frame transmission determining unit configured to compare a carrier detection time with the time-out time to determine whether to transmit or discard the wireless frame, and notify a control unit of a result of the determination, the carrier detection time being a time period during which a carrier notified from the carrier sense unit is detected,
    wherein the control unit is configured to, based on the result of the determination notified from the frame transmission determining unit, (i) notify the transmission unit that the wireless frame is to be transmitted when the frame transmission determining unit determines to transmit the wireless frame, and (ii) discard the wireless frame when the frame transmission determining unit determines to discard the wireless frame; and
    when the transmission unit is notified from the control unit that the wireless frame is to be transmitted, the transmission unit is configured to immediately transmit the wireless frame without waiting for a random transmission stand-by time before the transmission.

2. The wireless communication device according to claim 1, wherein
    the frame transmission determining unit is configured to (i) determine to transmit the wireless frame when a numerical value obtained by subtracting the carrier detection time from the time-out time is larger than or equal to 0, and (ii) determines to discard the wireless frame when the numerical value is less than 0.

3. A non-transitory computer-readable recording medium embedded with a program, the program causing a computer to function as a wireless communication device in a wireless communication system and perform steps comprising:

transmitting a wireless frame;
checking whether or not any carrier is being transmitted from other wireless communication devices;
calculating a necessary transmission time which is an estimated time period taken from start of the transmission of the wireless frame to completion of the transmission;
calculating a time-out time from the predetermined time period and the necessary transmission time;
comparing a carrier detection time with the time-out time to determine whether to transmit or discard the wireless frame, and notifying a control unit of a result of the determination, the carrier detection time being a time period during which a carrier is detected,
wherein, based on the result of the determination of whether to transmit or discard the wireless frame, the control unit (i) notifies that the wireless frame is to be transmitted when it is determined to transmit the wireless frame, and (ii) discards the wireless frame when it is determined to discard the wireless frame; and
when notified from the control unit that the wireless frame is to be transmitted, immediately transmitting the wireless frame without waiting for a random transmission stand-by time before the transmission.

* * * * *